Oct. 1, 1929.   C. T. PFLUEGER ET AL   1,730,331
FISHING REEL
Original Filed Aug. 13, 1923    4 Sheets-Sheet 1
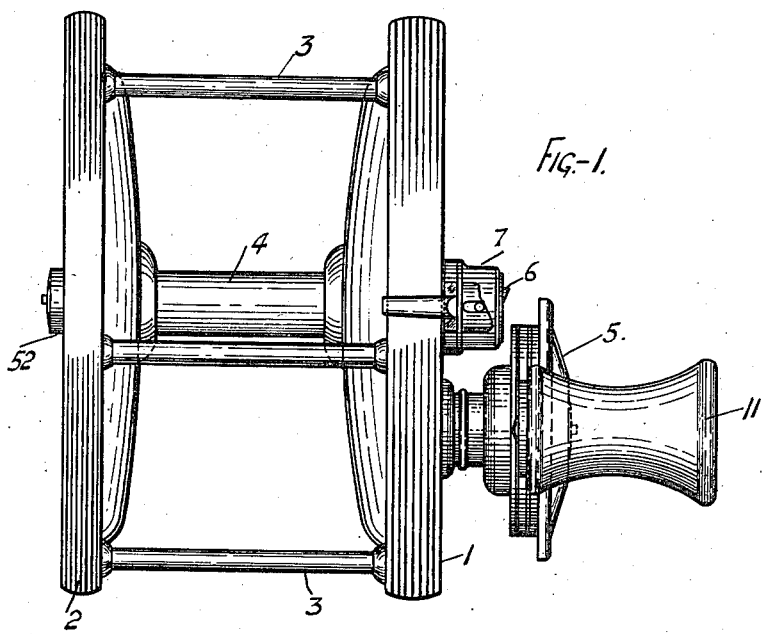
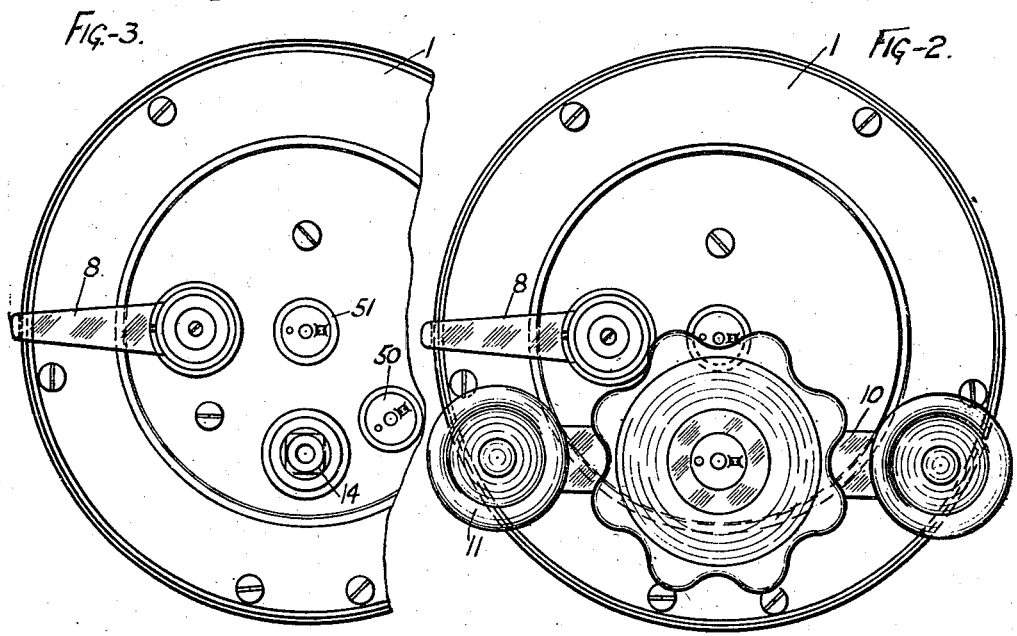
Inventors.
CHARLES T. PFLUEGER.
FRANK B. KOEHLER.

Oct. 1, 1929. C. T. PFLUEGER ET AL 1,730,331
FISHING REEL
Original Filed Aug. 13, 1923 4 Sheets-Sheet 2

Inventors.
CHARLES T. PFLUEGER.
FRANK B. KOEHLER.

Oct. 1, 1929.  C. T. PFLUEGER ET AL  1,730,331
FISHING REEL
Original Filed Aug. 13, 1923   4 Sheets-Sheet 3
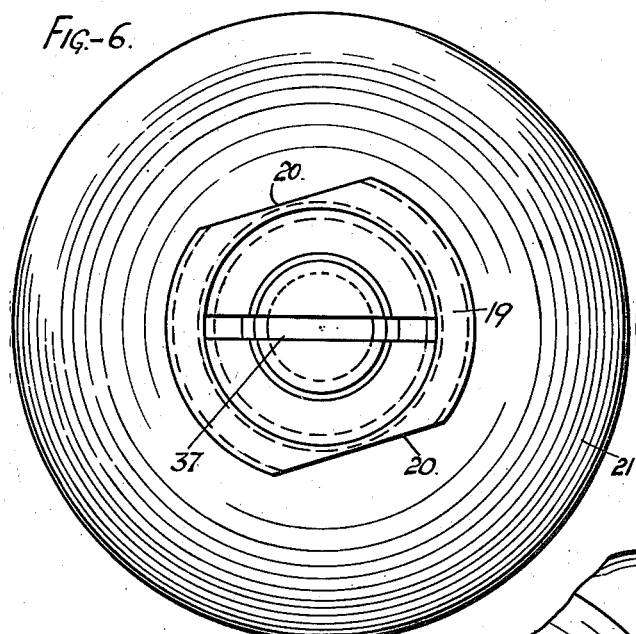
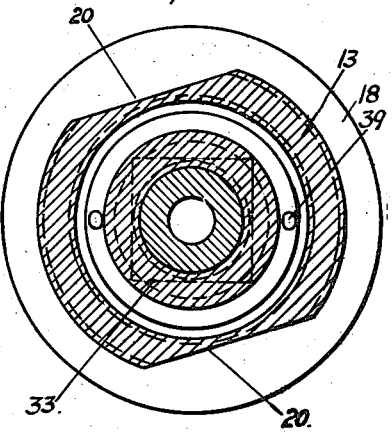
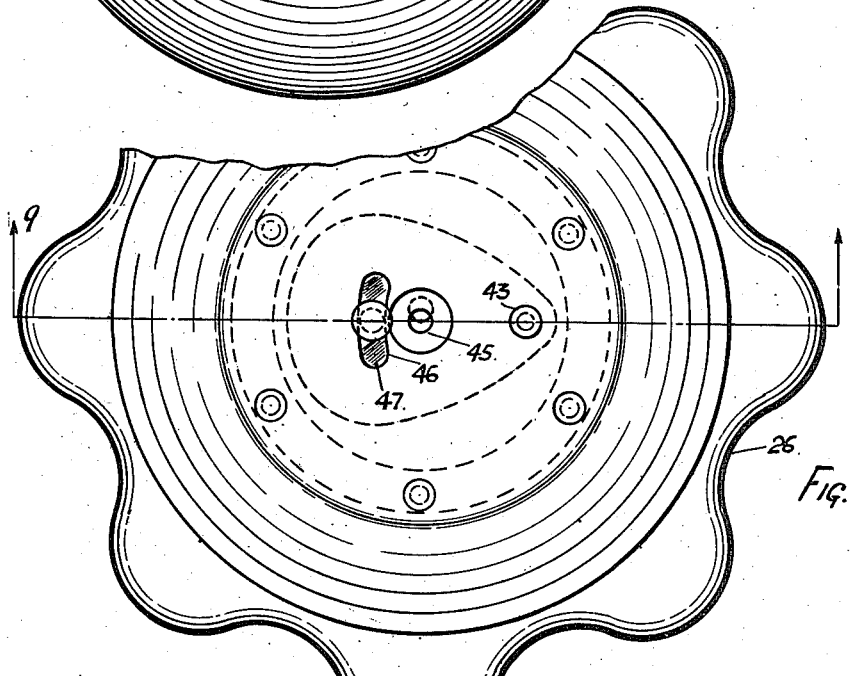
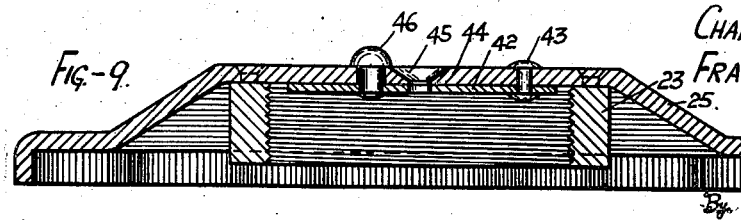
Inventors.
CHARLES T. PFLUEGER.
FRANK B. KOEHLER.
Attorney.

Oct. 1, 1929.   C. T. PFLUEGER ET AL   1,730,331
FISHING REEL
Original Filed Aug. 13, 1923   4 Sheets-Sheet 4

Inventors
CHARLES T. PFLUEGER.
FRANK B. KOEHLER.
By
Attorney.

Patented Oct. 1, 1929

1,730,331

UNITED STATES PATENT OFFICE

CHARLES T. PFLUEGER AND FRANK B. KOEHLER, OF AKRON, OHIO, ASSIGNORS TO THE ENTERPRISE MANUFACTURING COMPANY, OF AKRON, OHIO, A CORPORATION OF OHIO

FISHING REEL

Application filed August 13, 1923, Serial No. 657,096. Renewed October 9, 1928.

This invention relates to fishing reels and has for its object the provision of new and improved means for oiling or lubricating the operating parts of the reel. This invention is here shown as applied to a fishing reel of the drag handle type; certain portions of the invention may be applied equally well to other types and forms of reels.

A further object of the invention is to improve upon drag handle mechanism for fishing reels, particularly for the purpose of lubricating the bearings for this type of reel.

Other objects and purposes will be apparent from the description of the invention as contained herein, in which several forms of the various features of the invention are shown and described, it being understood that the invention is not necessarily limited to such forms.

In the drawings:

Figure 1 is a side elevation of a fishing reel of the drag handle type showing the invention as applied thereto;

Figure 2 is a plan view;

Figure 3 is a plan view with the drag handle removed;

Figure 4:
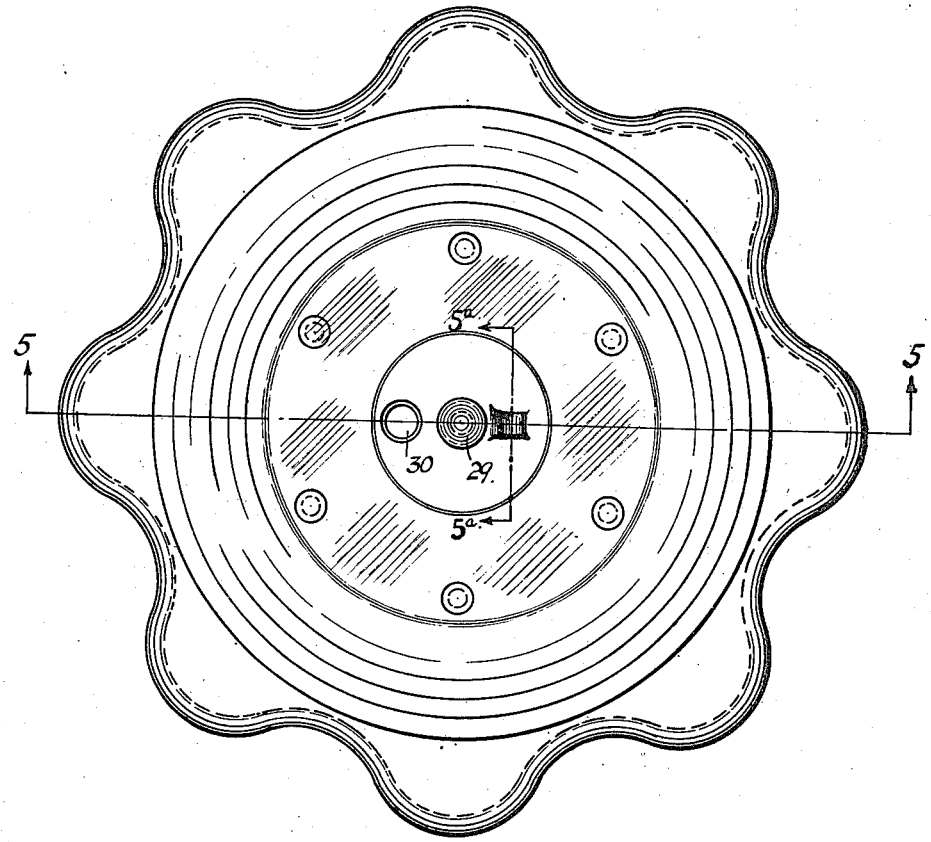
Figure 4 is an enlarged plan of the tightening nut for the drag handle.
Figure 5:
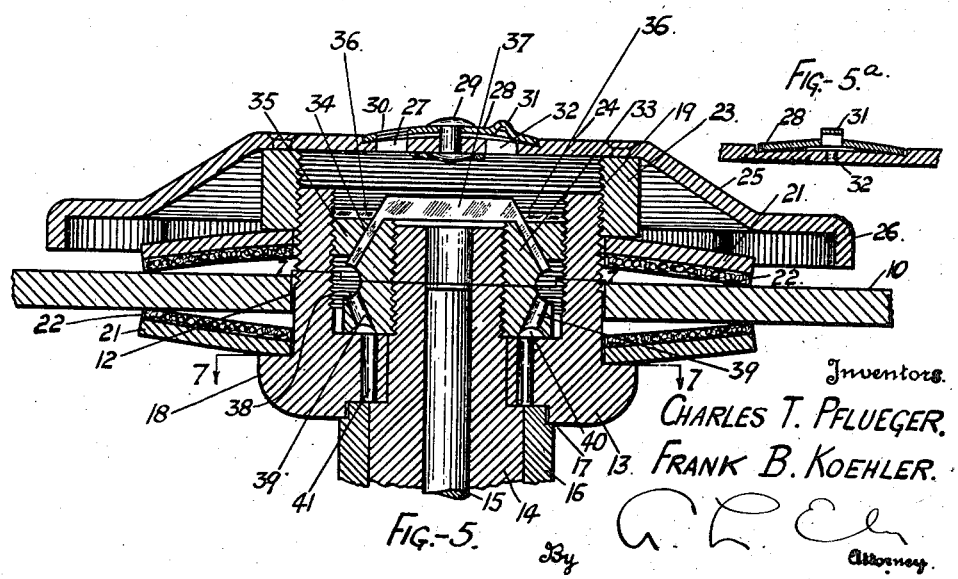
Figure 5 is a section on the line 5—5 of Figure 4.
Figure 10:
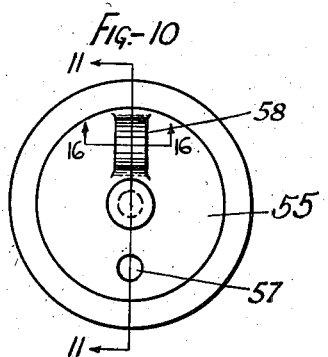
Figure 11:
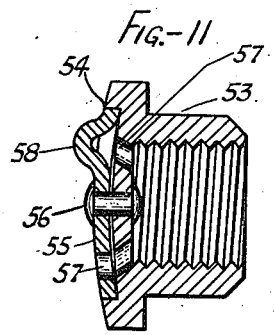

Figure 5ª is a detail section of the oiling device;

Figure 6 is a plan of the drag handle lubricating mechanism with the nut removed;

Figure 7 is a section on the line 7—7 of Figure 5;

Figure 8 is a modification of the tightening nut shown in Figure 4;

Figure 9 is a section on the line 9—9 of Figure 8;

Figures 10 to 16 inclusive show several forms of cap bearing lubricating devices.

In Figure 1 of the drawings, there is illustrated a drag handle fishing reel of any usual or preferred type, in which the front plate is designated by the numeral 1, the back plate 2, the pillars 3 and the spool at 4. The spool is driven by any suitable gearing housed in the plate 1 and actuated by a handle, indicated generally by the numeral 5, which handle is of the friction or drag type. The reel may be provided with a stop pin 6 slidably mounted in a barrel 7 on the front plate 1 and projected or retracted by an oscillating thumb lever 8. Any clicking or retarding mechanism may be substituted for the stop pin, as will be understood.

The drag handle, which has been designated generally by the numeral 5, comprises the transversely extending plate 10, which is provided at its ends with the rotary grips 11. The center of the plate is provided with the circular aperture 12 which fits over and rotates on a central hub 13 which is squared to fit the upper end of the shaft 14 which operates the gears to drive the spool. The shaft 14 is received on a spindle 15 and is located within a sleeve 16 extending from the front plate 1. The upper end of the sleeve 16 may be reduced to provide an extension 17 over which the hub 13 is fitted.

The outer surface of the hub is formed with a projecting ledge 18 from which rises the central housing 19, the inner and outer surfaces of which are screw-threaded. As stated above, the handle plate 10 is provided with a circular opening placed over the hub so that it is free to rotate about the hub. The housing is cut away or flattened at two opposite points 20 so as to provide a non-rotative connection for two arched spring disks 21 placed above and below the handle plate 10 and provided with central openings to fit over the flattened portion of the hub. Between the surfaces of the disks and the handle plate are placed suitable friction disks, such as fibre washers 22. A ring nut 23 is threaded upon the end of the hub and bears against the spring disks 21, thus furnishing an adjusting means for increasing or diminishing the frictional engagement of the washers with the surfaces of the handle plate 10, regulating the tension under which the spool will operate. The nut 23 is carried upon the under surface of an operating disk 24, the central portion 25 of which is elevated or coned, as shown in Figure 5, to house the hub, and the rim of which is undulated or recessed, as shown at 26, to afford a satisfactory grip for the fisherman.

Means are provided in the disk 24 for applying oil to the rotating parts of the drag handle. This is preferably furnished by means of an oil hole 27 formed near the center of the disk and over the hub 13. A rotating shutter or cover plate 28 is pivotally mounted, by means of a rivet 29, on top of the disk, which is recessed to receive it. The cover plate is provided with a hole 30 adapted to register with the hole 27 and also with a small projection 31 which is struck up from the body of the plate and adapted to be engaged by the fisherman for rotating the cover plate. As shown in Figure 5ª, the metal of the disk is preferably broken slightly at the point 31 so as to afford a vent which will register with a second opening 32 in the top of the disk. The purpose of forming the cover plate in this manner is to allow the air within the hub to escape when oil is admitted through the opening 27, thus avoiding bubbling of the oil at the hole.

The hub 13 is passed over the end of the shaft 14, in the manner indicated in Figure 5, and is held in place by a nut 33 which is screwed upon the threaded end of the shaft. The nut is somewhat smaller than the cavity in the hub in which it is received and its upper end is coned, as shown at 34. A lock washer 35, the under surface of which is coned to correspond to the surface 34, is located within the cavity of the hub and in screw threaded engagement with its inner surface. The upper surface of the lock washer is formed with a kerf or groove 36 by which it may be screwed down into tight engagement with the nut. The upper surface of the nut is provided with a transverse slot or kerf 37 which is cut through so as to communicate with the inner cavity thereof. The slot or kerf is continued down the sides of the nut into a groove 38 around the nut from which lead small openings 39 to a groove 40 on the under side of the nut. A number of small openings 41 lead to the bearing 17.

From the description which has been given, it will be seen that oil admitted through the hole 27 will pass into the kerf 37 and from there directly to the top of the spindle 15 and lubricate the bearing at this point. A portion of the oil will also find its way down the inclined ends of the kerf into the grooves 38, through the openings 39 and 41 and thence to the bearing around the top of the sleeve 16. In this way all of the rotating parts of the drag handle are lubricated.

As a modification of the operating plate 24, the small disk 28 may be replaced by a shutter or plate 42, pivoted at 43 to the under side of the operating disk and provided with a hole 45 on the disk. A stud 46 passing through the arcuate slot 47 in the disk affords a means for moving the shutter 42 to bring the holes into or out of register.

To further lubricate the operating parts of the reel, a rotating shutter 50, similar to the shutter 28, may be mounted in the top plate of the reel over the gears and the caps 51 and 52 for the spool spindle bearings may also be provided with similar shutters. In Figures 10 to 16 inclusive, there are shown several forms of caps which may be located at either end of the spool spindle. The cap 53 is provided with a recess 54 in which is rotatably mounted a shutter plate 55 by means of a central rivet 56. Oil holes 57 are provided through the shutter and through the cap and a struck up projection 58 affords means for turning the shutter.

Figure 12:
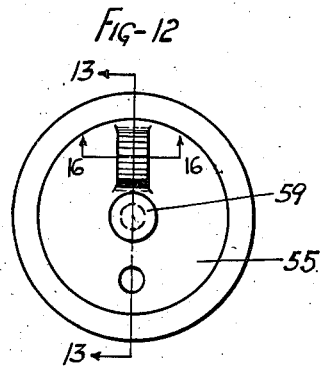
Figure 13:
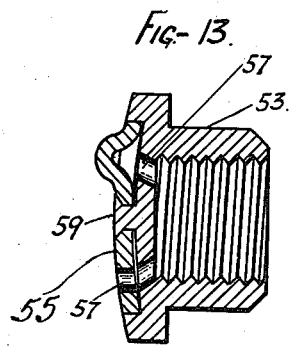

In Figures 12 and 13 the arrangement is similar except that an integral stud 59 is substituted for the rivet.

Figure 14:
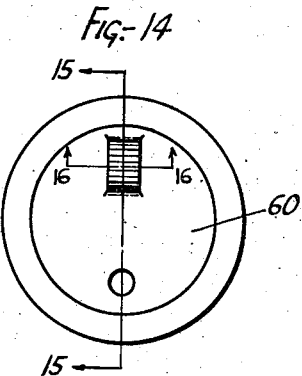
Figure 15:
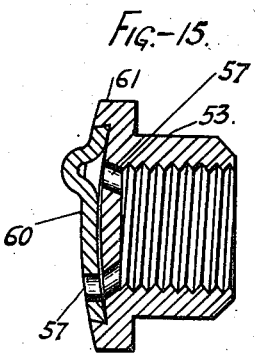
Figure 16:
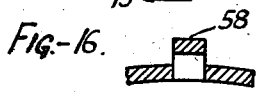

In Figures 14 and 15, the shutter 60 is provided with a slightly conical edge which is retained in position by the overhanging wall 61 of the cap plate 53. In all instances, it is preferable to strike up the lug 58, as shown in Figure 16, so as to break the metal at this point and provide an air vent as has been described.

It is to be noted that the shutter in the forms as shown in Figures 1 to 5 and 10 to 16 is of dished or concave formation, with respect to its seat on the end plate of the reel. A relative dishing or concave formation between the shutter and its seat provides a tensioning or spring action in the shutter when it is secured on the seat to rotate thereon in any of the various ways shown which sets up a frictional resistance to turning of the shutter sufficiently to prevent accidental turning of the shutter and thus preventing leakage of the oil or lubricant out of the device or admission of dirt, sand or grit therein.

While the description and showing have been specific in order to enable the invention to be understood, it will be appreciated that changes and modifications may be made without departing from the invention or sacrificing any of its benefits.

Having described our invention, what we claim as new and desire to secure by Letters Patent of the United States is:

1. A crank handle comprising a shaft having a central opening therein and a screw threaded reduced end portion, a sleeve surrounding said shaft, a hub on said shaft having a central recess therein, the said hub being provided with internal and external screw threads, a bearing between the hub and sleeve, a nut screwed onto the end of the shaft for holding the hub in place, the outer periphery of said nut being smaller than the cavity in the hub and being coned at its outer end, the said nut being provided with a transverse groove on its outer end, a circular groove on its inner end, a peripheral groove intermediate its ends, peripheral slots connecting the transverse groove and the central groove and passageways connecting the central groove with the inner end groove, the end groove communicating with the bearing through passages formed in the end of the hub, a locking ring having threaded engagement with the inside of the hub and a conical bearing surface for engagement with the conical end of the locking nut for holding the latter in position, a pair of arched friction disks surrounding said hub and having a non-rotative connection therewith, a crank handle interposed between the disks, and means to adjust the tension of the disks against the handle, said means including a nut threaded over the end of the hub and engaging one of said disks, an operating disk carried on the outer end of said nut, the said disk being provided with a centrally located oil aperture and an air opening, a shutter pivotally mounted on said disk having openings adapted to register with the said aperture and opening in the operating disk.

2. In a fishing reel the combination with the spool of a drag handle mechanism comprising a shaft having a central opening therein, a hub on said shaft having a central recess, a nut screwed onto the end of the shaft for holding the hub in place, the said nut being provided with a transverse groove on its outer end, a circular groove on its inner end, a peripheral groove intermediate its ends, slots connecting the transverse groove and the central groove and passageways connecting the central groove and inner end groove, the latter groove communicating with the exterior of the shaft by passages formed in the end of the hub, a cover plate for the outer end of the hub provided with an opening for admitting a lubricant to the recess in the hub and a second opening to afford an outlet for air within the hub, and a pivoted shutter on said cover plate having openings adapted to register with the openings in the cover plate.

3. In a fishing reel, the combination with the spool of a drag handle mechanism comprising a shaft, a hub, means for retaining the hub on said shaft, friction disks surrounding said hub and having a non-rotative connection therewith, a crank handle interposed between the disks, and means to adjust the tension of the disks against the handle, said means including a nut threaded over the end of the hub and engaging one of said disks, an operating disk carried on the outer end of said nut, the said disk being provided with an oil opening communicating with the recess in the hub, means being provided within the hub by which the oil is distributed to the interior and exterior of said shaft.

4. In a fishing reel, the combination with a spool of a drag handle mechanism comprising a shaft having a central opening therein, a hub having a central recess mounted on the end of said shaft, a locking nut threaded upon the end of the shaft for retaining the hub in position, the said nut and hub being provided with communicating passageways for distributing a lubricant to the interior and exterior of said shaft, friction disks surrounding said hub and having a non-rotative connection therewith, a handle interposed between the said disks, and means for adjusting the tension between the disks and the handle, the said latter means including a nut threaded upon the end of the hub and engaging one of said disks, and a disk secured to said nut, the said disk being provided with an opening through which a lubricant may be admitted to the recess within the hub.

5. In a fishing reel, the combination with a spool of a drag handle mechanism comprising a shaft having a central opening therein, a hub having a central recess mounted on the end of said shaft, a locking nut threaded upon the end of the shaft for retaining the hub in position, the said nut and hub being provided with communicating passageways for distributing a lubricant to the interior and exterior of said shaft, friction disks surrounding said hub and having a non-rotative connection therewith, a handle interposed between the said disks, and means for adjusting the tension between the disks and the handle, the said latter means including a nut threaded upon the end of the hub and engaging one of said disks, an operating disk secured to said nut, the said disk being provided with an opening through which a lubricant may be admitted to the recess within the hub, an opening for allowing the escape of air from said recess, and a shutter pivoted to said disk and provided with openings adapted to register with the openings in the said operating disk.

6. In a fishing reel, the combination with a spool of a drag handle mechanism comprising a shaft having a central opening therein, a hub having a central recess mounted on the end of said shaft, a locking nut threaded upon the end of the shaft for retaining the hub in position, the said nut and hub being provided with communicating passageways for distributing a lubricant to the interior and exterior of said shaft, a friction disk surrounding said hub and having a non-rotative connection therewith, a handle against which the disk bears, and means for adjusting the tension between the disk and the handle, the said latter means including a nut threaded upon the end of the hub, the nut having an opening through which a lubricant may be admitted to the recess within the hub.

7. In a fishing reel, the combination with a spool of a drag handle mechanism comprising a shaft having a central opening therein, a hub having a central recess mounted on the end of said shaft, a locking nut threaded upon the end of the shaft for retaining the hub in position, the said nut and hub being provided with communicating passageways for distributing a lubricant to the interior and exterior of said shaft, friction disks surrounding said hub and having a non-rotative connection therewith, a handle interposed between the said disks, and means for adjusting the tension between the disks and the handle, the said latter means including a nut threaded upon the end of the hub and engaging one of said disks, a covering over the nut, the said covering being provided with an opening through which a lubricant may be admitted to the recess within the hub, and a shutter pivoted to said covering provided with an opening communicating with the lubricant opening in the covering, and means on the shutter for turning the shutter about its pivot.

8. In a fishing reel, the combination with a spool of a drag handle mechanism comprising a shaft having a central opening therein, a hub having a central recess mounted on the end of said shaft, a locking nut threaded upon the end of the shaft for retaining the hub in position, the said nut and hub being provided with communicating passageways for distributing a lubricant to the interior and exterior of said shaft, friction disks surrounding said hub and having a non-rotative connection therewith, a handle interposed between the said disks, and means for adjusting the tension between the disks and the handle, the said latter means including a nut threaded upon the end of the hub and engaging one of said disks, an operating disk secured to said nut, the said disk being provided with an opening through which a lubricant may be admitted to the recess within the hub, an opening for allowing the escape of air from said recess, a shutter pivoted to said disk provided with an opening communicating with the lubricant opening in the operating disk, and means on the shutter for turning the shutter about its pivot, the said latter means consisting of a projection struck up from the body of the shutter, the said projection being provided with a vent communicating with the air outlet opening in the operating disk.

9. In a fishing reel, the combination with the spool of a drag handle mechanism comprising a shaft, a hub on said shaft, a bearing between the hub and the shaft, a drag handle mounted on said hub, a friction mechanism for connecting the handle to said hub, means for varying the tension of the friction mechanism including a nut screwed over the end of the hub, an operating disk on said nut, and oil passageways extending through said disk and hub and communicating with said bearings.

10. In a fishing reel, the combination with drag handle mechanism for operating the spool, including a shaft, a hub thereon, means for varying the tension upon the drag handle comprising an operating disk having oil passageways which communicate with the bearing between the shaft and the hub and permit lubrication thereof without interference with the drag handle mechanism.

11. In a fishing reel, the combination with the spool of a drag handle mechanism comprising a shaft, a hub on said shaft, a bearing between the hub and the shaft, a drag handle mounted on said hub, a friction mechanism for connecting the handle to said hub, means for varying the tension of the friction mechanism including a nut screwed over the end of the hub, an operating disk on said nut, and oil passageways extending through said disk and hub communicating with said bearings, the said disk being also provided with an air passage communicating with said cavity in the hub.

12. In a fishing reel, the combination with the spool of a drag handle mechanism comprising a shaft, a bearing surrounding said shaft, a hub having a central cavity on the end of said shaft, the end of the hub being provided with passages connecting the central cavity with the bearing, means within the cavity for locking the hub on the shaft, the said means being provided with oil channels communicating with the passages in the hub, a handle, a friction device therefor, and means to adjust the tension of said friction means, said latter means including a nut threaded over the end of the hub and engaging the friction means, an operating disk on said nut, the said disk being provided with an oil inlet and an air outlet communicating with the cavity of the hub.

13. In a fishing reel, the combination with the spool of a drag handle mechanism comprising a shaft, a bearing surrounding said shaft, a hub having a central cavity on the end of said shaft, the end of the hub being provided with passages connecting the central cavity with the bearing, and means within the cavity for locking the hub on the shaft, the said means being provided with oil channels communicating with the passages in the hub.

14. A fishing reel comprising spaced end members, a spool mounted between said members, a cap at the end of said spool, the cap being provided with an opening whereby a lubricant may be admitted to the interior thereof, and a shutter mounted upon the outer end of each bearing, said shutter having an opening adapted to be moved into and out of registration with the cap opening, and an outwardly extending projection by which the shutter is turned, the said projection being provided with an opening communicating with the interior of the caps to permit the escape of air confined therein.

15. A fishing reel comprising spaced end members, a spool mounted between said members, caps screwed upon the members, each of said caps being provided with an opening communicating with the interior thereof, a shutter mounted on the outer end of the cap and provided with an opening adapted to register with the opening in the cap, and means on the shutter to facilitate the turning thereof.

16. A fishing reel comprising a frame unit consisting of spaced end members, a spool between said members, caps at the ends of the spool, the said caps being provided with a central depression on the outer end thereof, a shutter fitted in said depression, the said cap and shutter being provided with lubricant openings, means on the shutter for moving the openings into and out of registration, the said means consisting of a projection struck up from the body of the shutter, the said projection being broken near the base thereof to provide an opening communicating with the interior of the cap.

17. A fishing reel comprising spaced end members, a spool mounted between said members, caps for the spool screwed upon the end members, each of said caps being provided with an opening communicating with the interior thereof, and a shutter mounted on the outer end of the cap and provided with an opening adapted to register with the opening in the cap.

18. A fishing reel comprising spaced end members, a spool between said members, a screw threaded cap adjustably mounted on an end member, an oiling aperture through the top of the cap, a rotatable shutter mounted on the cap, the shutter being provided with an opening adapted to be brought in register with the oiling aperture, and a lug formed on the shutter by which it may be rotated.

19. In a fishing reel, the combination with a spool of a drag handle mechanism comprising a shaft, a hub for the shaft, said hub being provided with a duct for supplying lubricant to said shaft, a handle on the hub, friction means for connecting the handle to the hub, means for adjusting the friction means including a nut threaded upon the hub, a covering over the nut, said covering being provided with an opening through which a lubricant may be admitted to the hub, and a shutter seated in a depression in the face of said covering over said opening, said shutter being substantially flush with the face of said covering and being secured to rotate in said depression, said shutter having an opening therein adapted to be brought into registration with the opening in the covering and having a projection from the body thereof whereby it may be rotated.

20. In a fishing reel, the combination with a spool of a drag handle mechanism comprising a shaft, a hub for the shaft, said hub being provided with a duct for supplying lubricant to said shaft, a handle on the hub, friction means for connecting the handle to the hub, means for adjusting the friction means including a nut threaded upon the hub, a covering over the nut, said covering being provided with an opening through which a lubricant may be admitted to the hub, and a shutter seated in a depression in the face of said covering over said opening, said shutter being substantially flush with the face of said covering and being secured to rotate in said depression, said shutter having an opening therein adapted to be brought into registration with the opening in the covering and having a projection from the body thereof whereby it may be rotated, the inner face of the shutter and the bottom of the depression being relatively concave, whereby the shutter is tensioned on its seat in the depression to resist accidental rotation thereof.

21. A fishing reel comprising spaced end members, a spool mounted between said members, caps screwed upon the member, each of said caps being provided with an opening communicating with the interior thereof, a shutter mounted on the outer end of the caps and provided with an opening adapted to register with the opening in the caps, said shutter being mounted so as to rotate in a depression in the face of the bearing and being substantially flush with the face of the bearing, the shutter and the bottom of the depression being relatively dished and the shutter being tensioned on its seat in the bottom of the depression to prevent accidental rotation thereof, and means on the shutter to facilitate turning thereof.

22. A fishing reel comprising spaced end members, a spool mounted between said members, caps screwed upon the member, each of said caps being provided with an opening communicating with the interior thereof, a shutter mounted on the outer end of the cap and provided with an opening adapted to register with the opening in the cap said shutter being mounted so as to rotate in a depression in the face of the cap and being substantially flush with the face of the cap, and means on the shutter to facilitate the turning thereof.

23. A fishing reel comprising a frame unit including an end member housing a part or parts to be lubricated, said end member having a lubricating duct therethrough, the outer end of said duct being in a depression in the face of the end member, a shutter seated in said depression so as to be substantially flush with the face of the end member, said end member having a rivet integral therewith for rotatably mounting and securing the shutter in said depression, the shutter having an aperture adapted to be brought into registry with said duct by rotation of the shutter, and means projecting from the body of the shutter for rotating the shutter, said shutter and its seat being relatively dished so that the shutter is held on its seat by said rivet with spring tension in the shutter preventing accidental rotation thereof.

24. A fishing reel comprising a frame unit including an end member housing a part or parts to be lubricated, said end member having a lubricating duct therethrough, the outer end of said duct being in a depression in the face of the end member, a shutter seated in said depression so as to be substantially flush with the face of the end member, said end member having a rivet integral therewith for rotatably mounting and securing the shutter in said depression, the shutter having an aperture adapted to be brought into registry with said duct by rotation of the shutter, and means projecting from the body of the shutter for rotating the shutter.

25. A fishing reel comprising a frame unit including an end member housing a part to be lubricated, a duct leading through the end member to said part, the outer end of said duct being in a depression in the end member, a shutter seated and rotatable in said depression and being substantially flush with the face of the end member and having an opening therein adapted to be brought into registration with said duct by rotation of the shutter, and means consisting of a projection from the body of the shutter for turning the shutter.

26. A fishing reel comprising a frame unit including an end member housing a part to be lubricated, a duct leading through the end member to said part, the outer end of said duct being in a depression in the end member, a shutter seated and rotatable in said depression and being substantially flush with the face of the end member and having an opening therein adapted to be brought into registration with said duct by rotation of the shutter, and means consisting of a projection from the body of the shutter for turning the shutter, said shutter being tensioned on its seat in the depression to prevent accidental rotation thereof.

27. In a fishing reel including a frame unit having an end member housing a part or parts to be lubricated and having a port through the end member for supplying lubricant to said part or parts in combination with a shutter seated on said end member, the abutting faces of the end member and shutter being relatively dished and the shutter being secured to rotate on the end member with a spring tension in the shutter serving to prevent accidental rotation of the shutter, said shutter having an opening therein adapted to be brought into registry with said duct by rotation of the shutter.

CHARLES T. PFLUEGER.
FRANK B. KOEHLER.